May 21, 1929.　　　K. L. STAHL　　　1,713,721

RADIO GROUND

Filed June 16, 1928

K. L. Stahl
Inventor

By Chenow & Co.
Attorneys.

Patented May 21, 1929.

1,713,721

UNITED STATES PATENT OFFICE.

KARL L. STAHL, OF LITTLE ROCK, ARKANSAS.

RADIO GROUND.

Application filed June 16, 1928. Serial No. 285,973.

This invention relates to a ground-terminal especially designed for use in connection with radio receiving sets, and aims to provide novel means whereby a more perfect grounding will be insured by maintaining the soil in which the ground-terminal is driven, in a moistened condition.

An object of the invention is to provide a ground-terminal including a pipe pointed at one end and provided with a drain opening to permit water fed to the pipe, to seep from the pipe to moisten the soil around the pipe.

A still further object of the invention is to provide a supply chamber at the upper end of the pipe for supplying water to the pipe, means being provided to allow the water to pass gradually into the pipe.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
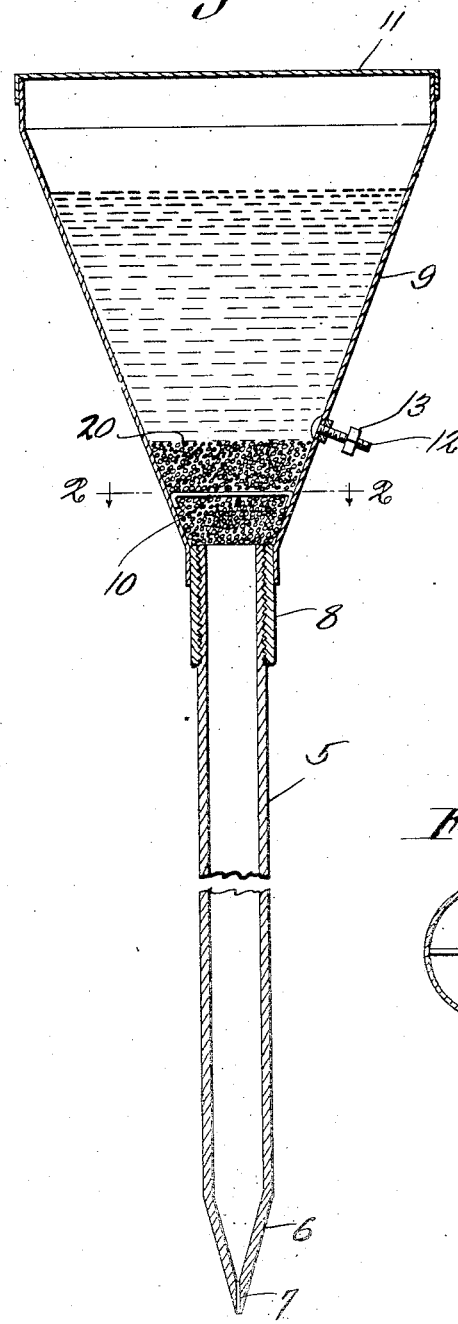
Figure 1 is a longitudinal sectional view through a ground-terminal constructed in accordance with the invention.

Referring to the drawing in detail, the device includes a pipe section 5 having a tapered extremity 6 formed with an opening 7 so that water may pass through the pipe and into the soil in which the pipe is positioned.

The upper end of the pipe section 5 is threaded to cooperate with the threads of the tubular bushing 8 secured within the lower end of the funnel-shaped water chamber 9 so that the water chamber may be removably secured to the pipe to facilitate shipping.

Cross bars 10 are mounted within the funnel-shaped chamber 9 and define a support for the material 20 which may be in the form of sand or gravel so arranged that the water contained in the chamber 9 will gradually seep therethrough to the end that the supply of water in the water chamber 9 will be sufficient to maintain the soil in which the pipe section 5 is driven, in a moist condition, for several days.

In order that water may be placed in the funnel-shaped chamber 9, a removable cover 11 is provided which cover will protect the water against evaporation, and at the same time insure against foreign matter entering the funnel-shaped member.

A bolt indicated at 12 extends through the wall of the chamber 9 and is provided with a nut 13 so that the ground wire from a radio receiving set may be secured thereto.

Figure 3:
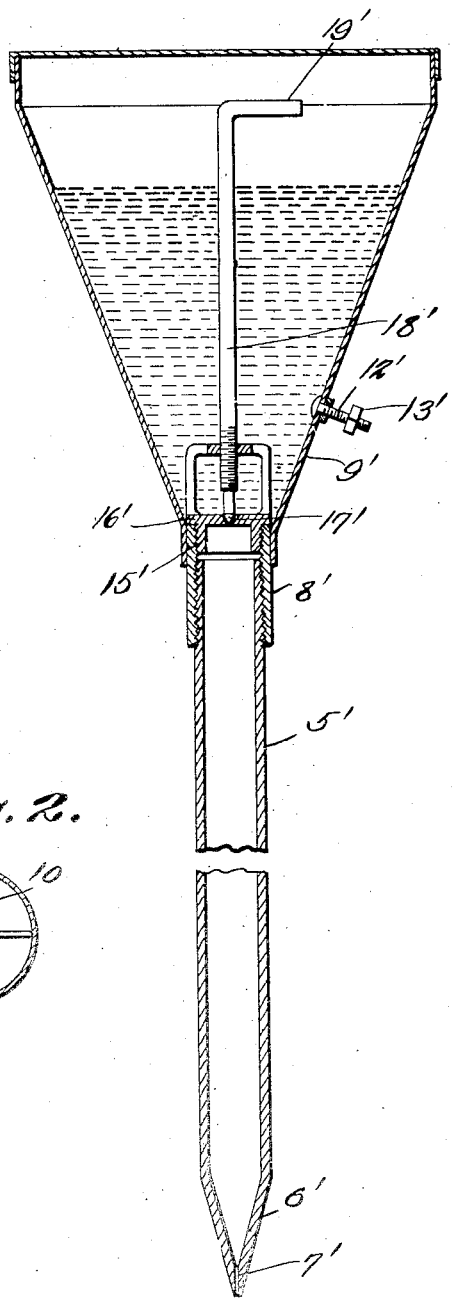
Figure 3 is a longitudinal sectional view through a modified form of the invention.
Figure 2:
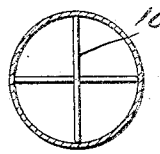
Figure 2 is a sectional view taken on line 2—2 of Figure 1.

In the form of the invention as shown by Figure 3, the pipe section which is indicated at 5' is also formed with a pointed extremity 6' which is provided with an opening 7' to allow water to pass therefrom.

The funnel-shaped water chamber 9' is formed with a threaded bushing 8', and as shown the internal threads of the bushing 8' cooperate with threads of the extension 15' of the valve member 16'. This valve member is provided with a tapered opening into which the tapered extremity 17' of the valve 18' extends, the valve 18' having a handle 19' at its upper end whereby the valve may be manipulated to regulate the passage of water into the pipe section.

A bolt 12' extends through the water chamber 9' and is supplied with a nut 13' so that the ground wire of a receiving set may be secured thereto.

From the foregoing it will be obvious that due to this construction the ground or soil into which the ground-terminal is driven, will be maintained in a moistened condition at all times to insure a true grounding.

I claim:

1. A ground-terminal including a pipe section, a water chamber mounted on the upper end of the pipe section to feed water to the pipe section, said pipe section having an opening to allow water to pass into the soil in which the pipe section is embedded, means for regulating the passage of water from the water chamber to the pipe section, and means on the water chamber to permit a wire to be secured thereto.

2. A ground-terminal including a pipe section having a tapered extremity formed with a discharge opening, a water chamber at the upper end of the pipe section for feeding water gradually to the pipe section, and means for restricting the passage of water from the water chamber to the pipe section.

3. A ground-terminal including a pipe section having a threaded upper extremity and an apertured tapered lower extremity, a water chamber removably supported on the threaded extremity of the pipe, means on the water chamber to permit a ground wire to be secured thereto, and means within the water chamber for restricting the passage of water into the pipe.

4. A ground-terminal including a pipe section, a receptacle at the top of the pipe section for containing water, a filtering material within the receptacle for regulating the passage of water from the receptacle, and means on the receptacle to permit a ground wire to be secured thereto.

In testimony that I claim the foregoing as my own, I have hereto affixed my signature.

KARL L. STAHL.